United States Patent [19]
Ueda et al.

[11] Patent Number: 5,359,600
[45] Date of Patent: Oct. 25, 1994

[54] HIGH THROUGHPUT SUPERVISORY SYSTEM FOR ATM SWITCHING SYSTEMS TRANSPORTING STM-N SIGNALS

[75] Inventors: Hiromi Ueda; Kenji Akutsu, both of Kanagawa; Ryuichi Ikematsu; Takatoshi Kurano, both of Tokyo; Yoshihiro Ashi, Kanagawa; Yukio Nakano, Kanagawa; Takafumi Chujo, Kanagawa; Shigeo Amemiya, Kanagawa, all of Japan

[73] Assignees: Nippon Telegraph and Telephone Corporation; NEC Corporation; Hitachi, Ltd.; Fujitsu Limited, Japan

[21] Appl. No.: 17,744

[22] Filed: Feb. 16, 1993

[30] Foreign Application Priority Data
Feb. 14, 1992 [JP] Japan ................... 4-28372

[51] Int. Cl.$^5$ ................ H04L 12/56; H04Q 11/04
[52] U.S. Cl. ................... 370/60.1; 370/94.2
[58] Field of Search ........... 370/16, 54, 58.1, 58.2, 370/58.3, 60, 60.1, 79, 91, 92, 94.1, 94.2, 41, 42, 43, 82, 83, 110.1, 112

[56] References Cited
U.S. PATENT DOCUMENTS

| | | | |
|---|---|---|---|
| 5,084,867 | 1/1992 | Tachibana et al. | 370/60 |
| 5,119,369 | 6/1992 | Tanabe et al. | 370/60 |
| 5,144,619 | 9/1992 | Munter | 370/60.1 |
| 5,204,857 | 4/1993 | Obara | 370/60.1 |
| 5,237,569 | 8/1993 | Sekihata et al. | 370/94.1 |
| 5,239,544 | 8/1993 | Balzano et al. | 370/94.2 |

*Primary Examiner*—Alpus H. Hsu
*Attorney, Agent, or Firm*—Ostrolenk, Faber, Gerb & Soffen

[57] ABSTRACT

In an ATM switching network, ATM (asynchronous transfer mode) self-routing switches are interconnected by facilities carrying STM-N (synchronous transport modules level N) signals. At each inlet of an ATM self-routing switch, an STM overhead is removed from each frame of an incoming STM-N signal to create a vacant interval and the frame is converted according to ATM cell format into a series of data ATM cells, and an idle ATM cell is derived from the vacant interval. A supervisory bit sequence is inserted to the payload field of the idle ATM cell to produce a supervisory ATM cell, and the data and supervisory ATM cells are sent into the ATM switch. At each outlet of the switch, the bit sequence of the supervisory ATM cell is checked to evaluate the quality of the ATM switch and a series of data ATM cells is then converted into an STM-N signal according to STM-N frame format.

3 Claims, 3 Drawing Sheets

HIGH THROUGHPUT SUPERVISORY SYSTEM FOR ATM SWITCHING SYSTEMS TRANSPORTING STM-N SIGNALS

BACKGROUND OF THE INVENTION

1. Field of the Invention

The present invention relates generally to switching systems, and specifically to a technique for monitoring the quality of an ATM (asynchronous transfer mode) switching system at periodic intervals for diagnostic purposes.

2. Description of the Related Art

In order to monitor the internal quality of an ATM self-routing switch, or a digital cross-connect system that transports STM-N (synchronous transport modules level N) signals, one approach would involve detecting an idle cell at each inlet of the switch, writing a supervisory bit sequence into the idle cell and detecting the supervisory bit sequence from each outlet of the switch to determine the quality of the path through which the idle cell has propagated. Another approach would involve the use of a buffer for storing AIM cells. A supervisory cell containing a supervisory bit sequence is generated and multiplexed with the ATM cells from the buffer. However, either of the approaches tends to lower the throughput of the switching system.

SUMMARY OF THE INVENTION

It is therefore an object of the present invention to provide a monitoring technique for an ATM switching system that monitors the quality of the switch without degrading its throughput.

This object is obtained by removing STM overheads from an incoming STM-N signal to create a vacant interval and utilizing it to produce supervisory ATM cells at periodic intervals.

According to the present invention, there is provided In an ATM switching system comprising an ATM self-routing switch having inlets and outlets. At least one incoming trunk circuit is connected to one of the inlets of the ATM self-routing switch for receiving an STM-N signal containing an STM overhead in a frame of the signal, and at least one outgoing trunk circuit is connected to one of the outlets of the ATM self-routing switch. According to this invention, the STM overhead (including path and section overheads) is removed from each frame of the STM-N signal received by the incoming trunk circuit to create a vacant interval and the STM-N signal is converted according to ATM cell format into a series of data ATM cells and at least one idle ATM cell is derived from the vacant interval. A supervisory bit sequence is inserted into the payload field of the idle ATM cell to produce a supervisory ATM cell, and all the data and supervisory ATM cells are sent into the ATM self-routing switch. The supervisory bit sequence of an ATM cell received by the outgoing trunk circuit is examined and the quality of the ATM self-routing switch is evaluated from the result of the examination. A series of data ATM cells received by the outgoing trunk circuit are converted into an STM-N frame according to STM-N frame format.

BRIEF DESCRIPTION OF THE DRAWINGS

The present invention will be described in further detail with reference to the accompanying drawings, in which.

DETAILED DESCRIPTION

Figure 1:
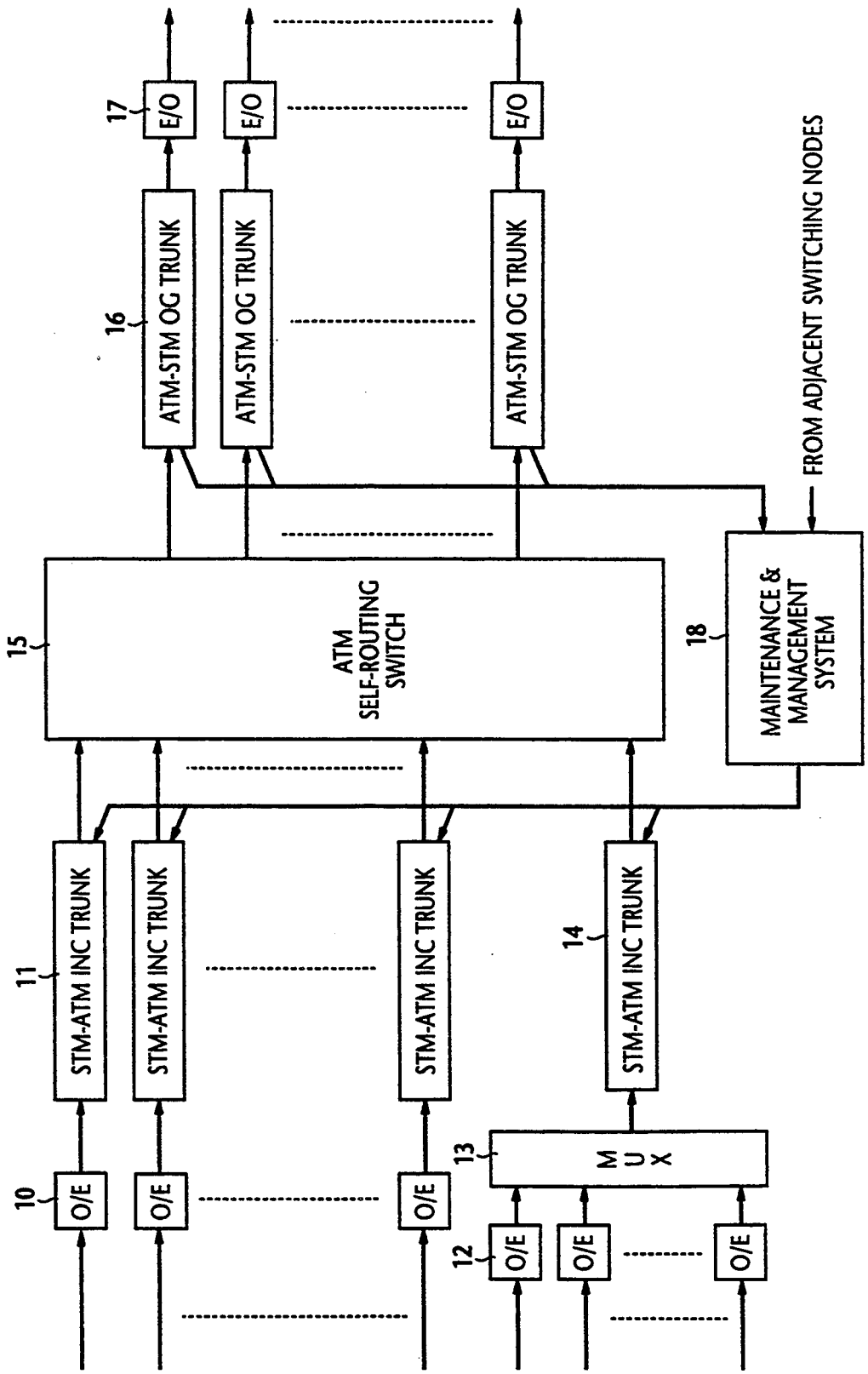
FIG. 1 is a block diagram of an ATM self-routing switching system incorporating a supervisory system of the present invention at interfaces between the ATM switching system and STM transmission links.

In FIG. 1, there is shown an ATM (asynchronous transfer mode) self-routing switching system for a high-speed ATM communications network such as BISDN (Broadband Integrated Services Digital Network) in which network nodes are interconnected by facilities carrying optical STM (synchronous transport modules level N) signals into which ATM cells are multiplexed. The incoming optical STM-N signals are formatted according to synchronous digital hierarchical (SDH) levels, which are identified by STM-N, where N is 1, 3, 4, 6, 8, 12 and 16, which correspond respectively to the North American designation STS, or synchronous transport signal levels M=3, 9, 12, 18, 24, 36 and 48.

Each incoming optical signal is converted by an opto-electrical transducer 10 and coupled to an STM-ATM receive interface unit, or incoming trunk circuit 11. A plurality of incoming trunk circuits 11 are terminated at the inlets of an ATM self-routing switch 15, such as Botcher-Banyan network. In the illustrated embodiment, the ATM switch 15 operates as a digital cross-connect system for providing switching of ATM cells on a relatively "static" basis, rather than on a "dynamic" basis. The outlets of the switch 15 are respectively connected to ATM-STM transmit interface units, or outgoing trunk circuits 16 whose outputs are coupled through electro-optical transducers 17 to optical transmission lines.

Depending on the needs of the network, each multiplex signal is decomposed by the respective incoming trunk circuit 11 into signals of lower digital hierarchical levels and switched individually to particular routes, or a number of incoming STM signals of lower levels are multiplexed into a higher level STM signal format and switched to a common route. In the latter case, incoming optical signals are converted to electrical signals by O/E transducers 12 and multiplexed by an add/drop multiplexer 13 for coupling to an STM-ATM incoming trunk circuit 14 whose output is connected to one of the inlets of the ATM switch 15.

A maintenance and management system 18 is provided to determine the routing plan of the system and adapt the routing of each incoming optical signal to the varying traffic of the network and unexpected cable failures in the outgoing routes by collecting information from adjacent switching nodes and controlling the appropriate incoming trunks. Additionally, the maintenance and management system 18 evaluates the quality of the ATM switch 15 by examining bit sequences by collecting data from all the outgoing trunk circuits 16 and controlling appropriate incoming trunk circuits 11 and 14.

Figure 2:
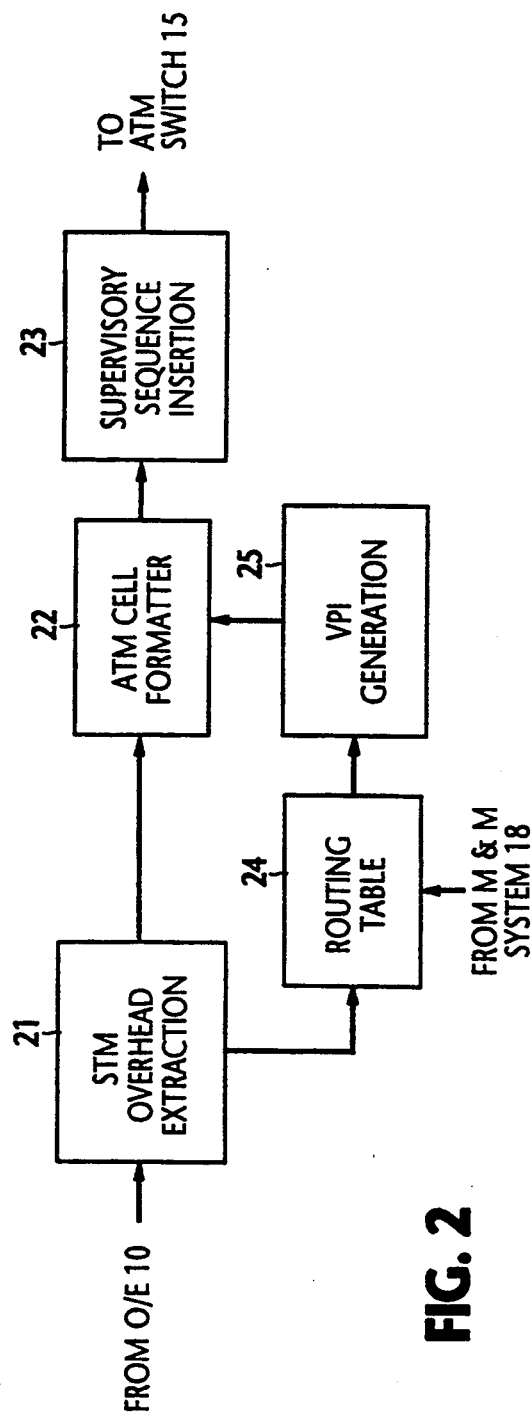
FIGS. 2 and 3 are block diagrams of the incoming trunk circuits of FIG. 1.

In FIG. 2, details of each incoming trunk circuits 11 are shown. The incoming trunk circuit 11 comprises an STM overhead extraction unit 21 which extracts a section overhead (SOH) and a path overhead (POH) from each frame of the incoming signal STM-N to create a vacant interval in the frame. The overhead-deleted STM-N signal is applied to an ATM cell formatter 22 where the payload bits of each STM-N frame are decomposed into a series of data ATM cells and at least one idle ATM cell. If the incoming signal is an STM-1 frame, a total of 2430 bytes of information is supplied to the STM overhead extraction unit 21 and 90 bytes of section and path overheads are extracted. The output of overhead extraction unit 21 is applied to ATM cell formatter 22 where the remaining 2340 byte data is converted into data ATM cells, and the 90-byte vacant interval is used to generate one idle ATM cell. Therefore, one idle ATM cell is generated for each frame of the STM-1 signal. Further connected to the STM overhead extraction unit 21 is a routing table 24 which defines unique relationships between incoming frames and outgoing routes. These relationships are specified by a switching command from the maintenance and management system 18 and altered as need arises. The extracted STM overheads are applied to the table 24 where they are used as a pointer for addressing an outgoing route for each frame. The output of routing table 24 is applied to a VPI (virtual path identifier) generation unit 25 where the routing information is used to generate a VPI for each incoming STM frame and inserts it into the cell header of each of the data ATM cells and the idle ATM cell. The output of ATM cell formatter 22 is applied to a supervisory sequence insertion unit 23 where a supervisory bit sequence is inserted to the payload field of the idle ATM cells. A series of data ATM cells and supervisory ATM cells are generated out of a single STM-N signal and sent into the ATM self-routing switch 15 from the output of the supervisory sequence insertion unit 23.

Figure 3:
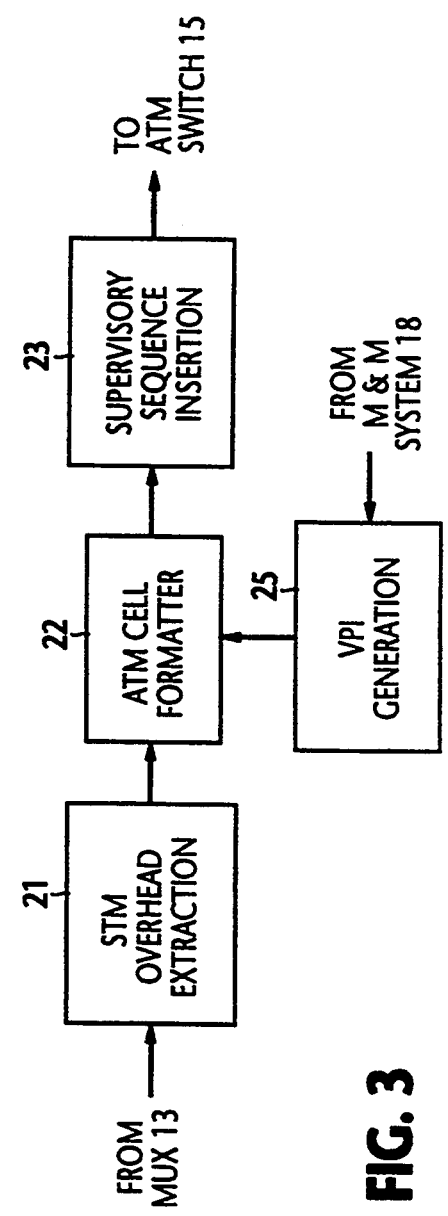
Figure 4:
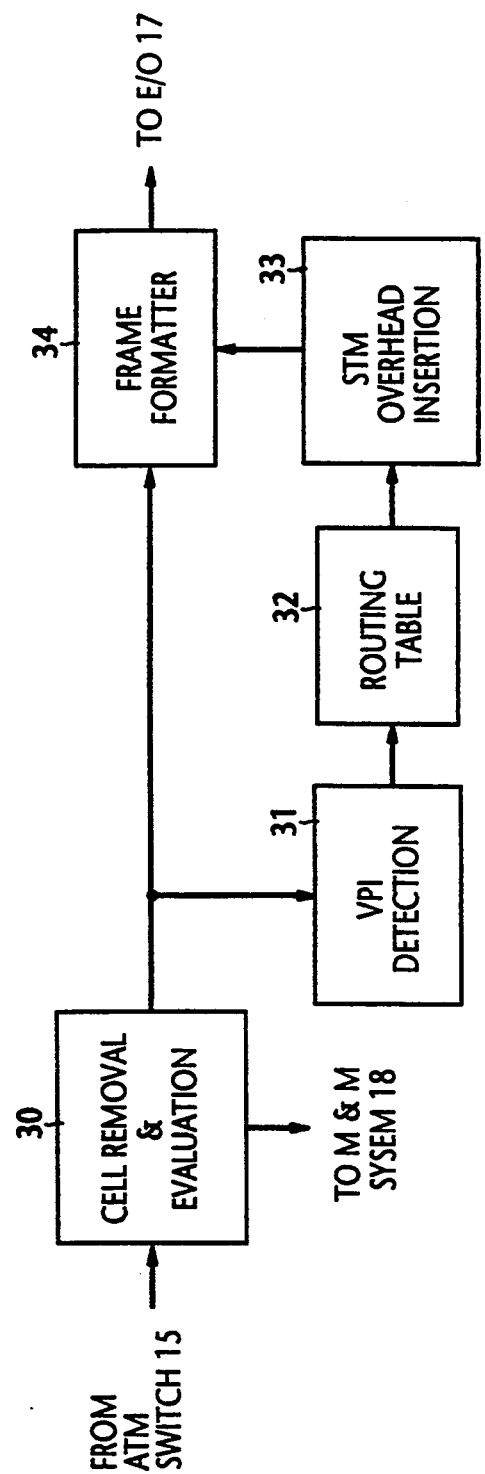
FIG. 4 is a block diagram of the outgoing trunk circuits of FIG. 1.

The ATM serf-routing switch 15 examines the VPI of each ATM cell received from any of the incoming trunk circuit 11 and routes it to one of the outgoing trunk circuits 16 specified by the VPI, FIG. 3 shows details of the incoming trunk circuit 14 for routing a multiplexed STM-N signal to a single outgoing route. Incoming trunk circuit 14 differs from the previous incoming trunk circuit 11 in that the VPI generation unit 25 is responsive only to the command signal from the maintenance and management system 18 to determine the VPI of each ATM cell according to the desired route, If a failure should occur in the desired route, the VPI of the incoming STM-N frame is altered by the maintenance and management system 18 to switch all the ATM cells of the frame to a single alternate route, FIG. 4 shows details of each outgoing trunk circuit 16. The outgoing trunk circuit 16 includes a supervisory cell extraction and evaluation unit 30 which extracts the supervisory ATM cell from incoming data stream from an outlet of the self-routing switch 15, and inspects the supervisory bit sequence contained in the payload field of the supervisory ATM cell to evaluate the quality of the serf-routing switch 15. If the result of the evaluation is unfavorable, a warning signal is supplied to the maintenance and management system 18, where it is collected with other warning signals, if any, to make appropriate actions.

A VPI (virtual path identifier) detection unit 31 is connected to an output of the cell extraction and evaluation unit 30 where a VPI is detected from each incoming ATM cell and supplied to a routing table 32. Routing table 32 defines a map between VPI's and route information concerning particular paths and sections of the network. An STM overhead insertion unit 33 is connected to the output of routing table 32 to supply appropriate path and section overheads for each outgoing STM frame to the frame formatter 34. The frame formatter 34 converts a series of data ATM cells into an STM-N signal according to the CCITT Recommendations G-series for coupling to an associated electro-optical transducer 17.

The foregoing description shows only one preferred embodiment of the present invention. Various modifications are apparent to those skilled in the art without departing from the scope of the present invention which is only limited by the appended claims, Therefore, the embodiment shown and described is only illustrative, not restrictive.

What is claimed is:

1. An asynchronous transfer mode (ATM) switching system, comprising:

an ATM self-routing switch having inlets and outlets for transferring an ATM cell from one of said inlets to one of said outlets according to a virtual path identifier (VPI) contained in a cell header of the ATM cell;

a plurality of incoming trunk circuits connected respectively to the inlets of the ATM self-routing switch, each of said incoming trunk circuits receiving a synchronous transport modules-level N (STM-N) signal containing an STM overhead in a frame of the STM-N signal; and a plurality of outgoing trunk circuits connected respectively to the outlets of the ATM self-routing switch, each of said outgoing trunk circuits receiving an ATM cell containing a VPI from the ATM self-routing switch;

each of the incoming trunk circuits comprising:

overhead removal means for removing said STM overhead from each frame of said STM-N signal to create a vacant interval in the frame;

STM-ATM format converting means for converting each frame of the STM-N signal from the overhead removal means according to ATM cell format into a series of data ATM cells and deriving at least one idle ATM cell from said vacant interval;

VPI generating means for inserting a VPI into the cell header of each of said data ATM cells and into the cell header of said idle ATM cell, each said inserted VPI identifying one of said outgoing trunk circuits; and means connected to said STM-ATM format converting means for inserting a supervisory bit sequence into payload field of said idle ATM cell to produce a supervisory ATM cell, and sending the data ATM cells and the supervisory ATM cell into one of said inlets of said ATM self-routing switch;

each of said outgoing trunk circuits comprising:

means for examining the supervisory bit sequence contained in the supervisory ATM cell received from one of said outlets of said ATM self-routing switch, and evaluating the quality of the ATM self-routing switch from the examined bit sequence; and ATM-STM format converting means for converting a series of the data ATM cells received from said one of said outlets of said ATM self-routing switch into an STM-N signal according to STM-N frame format.

2. An ATM switching system as claimed in claim 1, wherein the incoming trunk circuit further comprises means for establishing relationships between a successive frame of an STM-N signal and one of the outlets of the ATM self-routing switch, said relationships being alterable according to a switching command signal from a maintenance and management system, wherein said VPI generating means is responsive to the switching command signal for generating said VPI.

3. In an asynchronous transfer mode (ATM) switching system comprising an ATM self-routing switch having inlets and outlets, at least one incoming trunk circuit connected to one of the inlets of the ATM self-routing switch for receiving a synchronous transport modules-N (STM-N) signal containing an STM overhead in a frame of the signal STM-N, and at least one outgoing trunk circuit connected to one of the outlets of the ATM self-routing switch, each of said outgoing trunk circuits receiving an ATM cell containing a VPI from the ATM self-routing switch, a method comprising the steps of:

a) removing the STM overhead from the frame of said STM-N signal received by said at least one incoming trunk circuit to create a vacant time interval in said frame;

b) converting the STM-N signal according to ATM cell format into a series of data ATM cells and deriving at least one idle ATM cell from said vacant time interval, each of the data and idle ATM cells containing a cell header and a payload field;

c) inserting a supervisory bit sequence into the payload field of the idle ATM cell to produce a supervisory ATM cell and sending the data ATM cells and the supervisory ATM cell into one of said inlets of said ATM self-routing switch;

d) examining the supervisory bit sequence of the supervisory ATM cell received by said at least one outgoing trunk circuit, and evaluating the quality of the ATM self-routing switch from the examined supervisory bit sequence; and e) converting a series of the data ATM cells received by said at least one outgoing trunk circuit into a STM-N frame according to STM-N frame format.

* * * * *